L. H. PERLMAN.
WHEEL.
APPLICATION FILED SEPT. 23, 1916.
1,303,589.
Patented May 13, 1919.
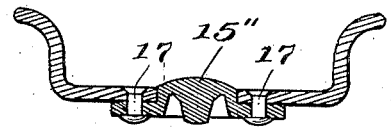
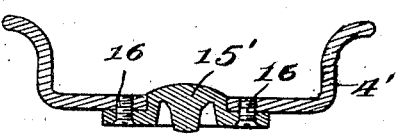
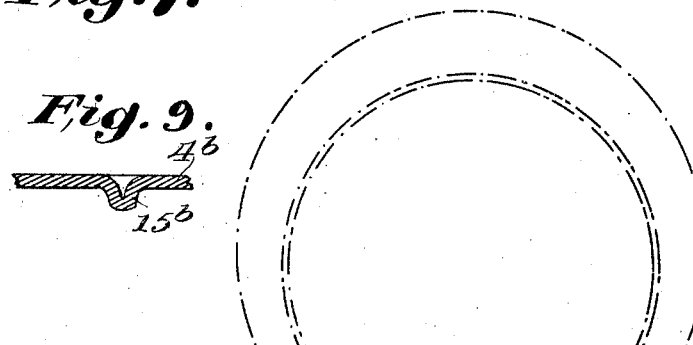
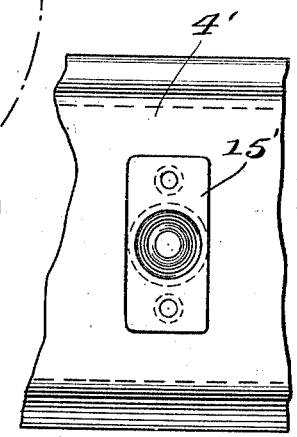
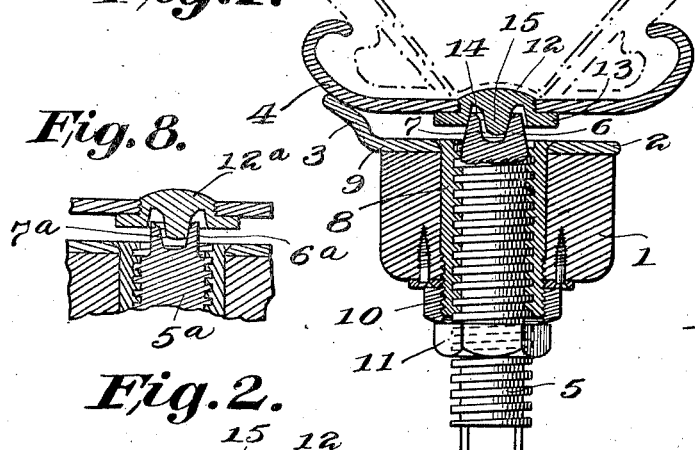
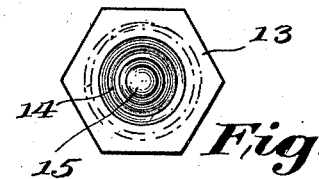
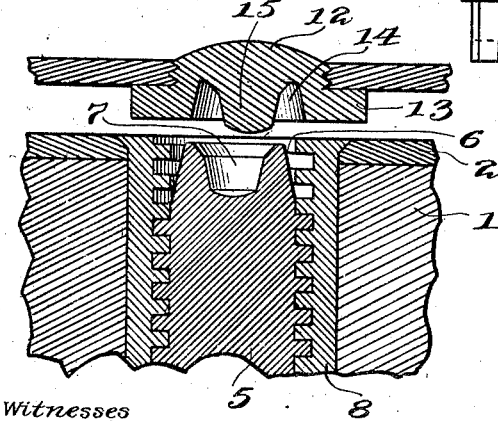
Witnesses
N. H. Lybrand
C. H. Fesler
Inventor:
Louis H. Perlman,
By Edgar M. Kitchin,
his Attorney

UNITED STATES PATENT OFFICE.

LOUIS H. PERLMAN, OF NEW YORK, N. Y.

WHEEL.

1,303,589.

Specification of Letters Patent.   Patented May 13, 1919.

Application filed September 23, 1916.   Serial No. 121,833.

*To all whom it may concern:*

Be it known that I, LOUIS H. PERLMAN, a citizen of the United States, residing at New York, in the county of New York and State of New York, have invented certain new and useful Improvements in Wheels; and I do hereby declare the following to be a full, clear, and exact description of the invention, such as will enable others skilled in the art to which it appertains to make and use the same.

This invention relates to improvements in demountable rim wheels of the type especially adapted for use on automobiles or like vehicles.

The object in view is the production of simple and efficient means for locking a demountable rim on a wheel body, which means shall be at one and the same time quick and easy to manipulate and inexpensive to construct.

With this and other detail objects in view, the invention comprises certain novel constructions, combinations and arrangements of parts as will be herein specified and claimed.

In the accompanying drawing,—

Figure 1 is a vertical cross section through the felly portion of a wheel embodying the features of the present invention, parts being seen in elevation.

Fig. 2 is a similar section of a fragment of the parts seen in Fig. 1, the parts being shown on an enlarged scale.

Fig. 3 is a detail, inverted plan of the tire-rim-carried cap.

Fig. 4 is an end view of the wedge end of the locking bolt.

Fig. 5 is a section through the tire rim alone of a slightly modified embodiment of the invention.

Fig. 6 is an inverted plan view thereof, a fragment only of the tire being seen.

Fig. 7 is a view similar to Fig. 5 of a further slight modification.

Fig. 8 is a view similar to Fig. 2 on a reduced scale of a slightly modified embodiment.

Fig. 9 is a transverse section through a rim provided with a modified embodiment of the invention.

Referring to the drawing by numerals, 1 indicates the wood felly of an ordinary automobile wheel or like vehicle wheel which is provided with the usual felly band or fixed rim 2 having the supporting stop flange 3 at its inner edge.

The tire-carrying rim 4 surrounds the band 2 and is of sufficiently greater diameter to be slightly spaced therefrom while being of sufficiently small diameter to rest against the flange 3.

At intervals about the circumference of the felly 1 are locking devices for locking the rim 4 against the flange 3 and for tensioning the rim in position. The number of such locking devices may be varied according to the size of the wheel and the service to be rendered. For ordinary purposes four or five such locking means on the average size automobile wheel will be found ample. Each of said locking devices is identical with that seen in Figs. 1 and 2 of the drawing, and consists of a radially disposed bolt 5 having at its outer end a wedging tip formed by tapering the tip to produce substantially a truncated cone 6, the cone being hollowed by a tapering axial recess 7. The bolt 5 is threaded through the felly 1 and band 2, and is preferably effectively anchored in the wheel body through the employment of a threaded sleeve 8 extending radially through the band 2 and felly 1 and clamped therein by a head 9 at the outer end of the sleeve overlapping portions of the band 2 and a nut 10 at the inner end of the sleeve engaging the inner face of the felly 1, or a wear plate connected with said felly. A lock nut 11 engages the bolt 5 and the nut 10 for locking both of said elements against unintentional release.

For each of the locking devices on the wheel body, the rim 4 is provided with a coöperating device consisting of a cap 12. The cap 12 is made up of a threaded shank having a head or flange 13, the shank being adapted to be threaded from the inside of the rim outwardly through the rim until the flange rests against the inner face of the rim 4. The cap 12 is formed with a tapering annular recess 14 corresponding in taper with the wedge cone 6 of the bolt 5. A radially inward projection 15 is formed integral with cap 12 and extends centrally of the recess 14 in position to enter the recess 7 as the cone 6 is entering the recess 14. The inclined walls of the cone 6, recess 14, projection 15, and recess 7 correspond in pitch so that the outer terminal portion of screw 5 may engage portions of the cap 12 at two points, as indicated clearly in Fig. 1, during the operation of locking the rim 4 in position. The inclination of the contacting walls during operation causes the terminal portion of bolt 5 to effect a wedging action on the rim 4 and to thrust the same axially against the flange 3. The parts are proportioned to effect this result, as clearly indicated, by the relative location of the parts in Fig. 2, which shows the rim in the position assumed when applied manually on the wheel before the operation of the bolt 5. It should be noted also that the projection 15 may be utilized as the stress-distributing member without the coöperation of the outside walls of the bolt or the wall of the recess 14. To cause the parts to have this effect, it would be necessary to increase the size of the recess 14 sufficiently to prevent engagement thereof by the tapered outer portion of the bolt 5, or to sufficiently reduce said tapered outer portion to prevent contact with the outer wall of recess 14.

In operation, the bolts 5 are withdrawn to the position indicated in Fig. 2 for enabling the rim 4 to be moved axially manually off of the wheel for interchange of tires or other purposes. After such interchange the rim 4 is replaced axially onto the wheel, it being understood, of course, that after the usual practice in the manipulation of demountable rims the valve stem (not shown) is inserted and the rim "rocked" into place where it rests against the flange 4. The parts are then in the position indicated in Fig. 2. The contact between the rim 4 and flange 3 is at that time only such as is obtainable by the manual application of the rim, which is only a "loose" contact by which is meant that there are but a few points of actual contact between the rim and flange. The bolts 5 are then turned outward until the inclined walls thereof engage the inclined walls of the cap 12 and wedge the rim 4 firmly into contact with the flange 3. The actual amount of axial movement is very slight but the result is essential to the successful operation of the demountable rim, because with a loose contact between rim 4 and flange 3 the rim would be noisy and would wear at the points of contact, but with the more intimate contact produced by the forceful axial thrust of the rim incident to the wedging action of the locking elements relative movement of the contacting parts is eliminated and noise and wear are consequently eliminated.

The method of connection of the cap 15 to the rim 4 is susceptible of a wide range of variation without in any sense departing from the spirit and scope of the invention.

In Figs. 5 and 6 are illustrated cap 15' and connections therefor, differing from the connections of cap 15. The cap 15' is shown as bolted in place by the employment of screws 16, 16. The screws may otherwise be arranged than as illustrated, and in this form the cap preferably has its flange elongated in an axial direction across the rim 4'.

The cap may also be secured by rivets 17, 17, as seen in Fig. 7, the cap 15'' therein being shown as flanged similarly to the cap seen in Figs. 5 and 6.

In Fig. 8 is seen parts corresponding with those seen in Fig. 2, the bolt $5^a$ however having its tip $6^a$ formed exteriorly cylindrical, the walls of the recess $7^a$ of the tip being inclined the same as the walls of recess 7. Cap $12^a$ in this embodiment is substantially identical with cap 12.

In Fig. 9 is illustrated a further embodiment of that portion of the invention appertaining to the demountable rim. In this figure the rim $4^b$ is formed with an integral substantially conical centrally positioned depression $15^b$ corresponding in location and function to the projection 15 of the structure seen in Fig. 1. The projection $15^b$ is stamped from the body of the rim $4^b$ and the necessity for detachable connection is thus obviated. The depression left in the outer face of the rim 4 will not be sufficient to injure an inner tube, and usually a strip of canvas or other fabric is placed about the outer face of the demountable rim in a manner to receive the inner tube of the tire and prevent the same from striking against the metal of the rim.

What I claim is:—

1. In a wheel structure of the class described, the combination with a wheel body and a demountable rim therefor, of securing means for the rim, comprising a locking bolt having a screw threaded engagement with the wheel body and having an axial conical recess, and a conical projection on the demountable rim adapted to enter said recess, the projection and bolt being located relative to each other for wedging the rim to its final operative position on the wheel body.

2. In a wheel structure of the class described, the combination with a wheel body and a demountable rim therefor, of a demountable rim locking bolt threaded radially through a portion of the wheel body and having a recess extending axially in its outer end, the said recess being adapted to receive a portion of the demountable rim for wedging and locking the rim in its final position on the wheel body.

3. In a demountable rim structure, a cap connected thereto and formed into cup shape, the cap having a projection extending into the space surrounded by the cup, the said projection being adapted to receive wedge locking means.

4. In a demountable rim structure, a demountable rim and a cap connected thereto, the said cap being formed with a radially inwardly extending tapered projection adapted to receive wedging locking means.

In testimony whereof I affix my signature in presence of two witnesses.

LOUIS H. PERLMAN.

Witnesses:
 I. B. LEIBSON,
 O. W. MOTT.